(12) United States Patent  (10) Patent No.: US 8,125,525 B2
Tokai  (45) Date of Patent: Feb. 28, 2012

(54) INFORMATION PROCESSING APPARATUS, REMOTE INDICATION SYSTEM, AND COMPUTER READABLE MEDIUM

(75) Inventor: Kiwame Tokai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 357 days.

(21) Appl. No.: 12/425,929

(22) Filed: Apr. 17, 2009

(65) Prior Publication Data

US 2010/0085435 A1  Apr. 8, 2010

(30) Foreign Application Priority Data

Oct. 7, 2008 (JP) .................... 2008-261106

(51) Int. Cl.
*H04N 5/225* (2006.01)
(52) U.S. Cl. ............ 348/207.11; 348/86; 348/125; 348/139; 348/159; 348/231.2; 386/218; 386/220
(58) Field of Classification Search ............ 348/207.11, 348/231.2, 207.1, 231.3, 231.6, 231.9, 86–95, 348/125–134, 139, 143, 153, 159; 386/218, 386/219, 220, 230
See application file for complete search history.

(56) References Cited

U.S. PATENT DOCUMENTS

| 6,980,690 B1 * | 12/2005 | Taylor et al. .................. 382/154 |
| 2003/0048356 A1 * | 3/2003 | Kohno et al. .................. 348/143 |
| 2004/0070674 A1 * | 4/2004 | Foote et al. ............. 348/207.99 |
| 2005/0001024 A1 * | 1/2005 | Kusaka et al. ................. 235/375 |
| 2005/0162268 A1 * | 7/2005 | Grindstaff et al. ............ 340/531 |
| 2006/0290786 A1 | 12/2006 | Tokai |
| 2007/0121720 A1 | 5/2007 | Yamane et al. |
| 2010/0115052 A1 | 5/2010 | Ishii |

FOREIGN PATENT DOCUMENTS

| JP | 2005-033756 A | 2/2005 |
| JP | 2005-189923 A | 7/2005 |
| JP | 2006-108813 A | 4/2006 |
| JP | 2006-352495 A | 12/2006 |
| JP | 2006-352497 A | 12/2006 |
| JP | 2007-158410 | * 6/2007 |
| JP | 2007-158410 A | 6/2007 |
| JP | 2008-152625 A | 7/2008 |

OTHER PUBLICATIONS

Japanese Office Action dated Jul. 13, 2010 for corresponding Japanese patent application No. 2008-261106.

(Continued)

*Primary Examiner* — Tuan Ho
*Assistant Examiner* — Kent Wang
(74) *Attorney, Agent, or Firm* — Sughrue Mion, PLLC

(57) ABSTRACT

An information processing apparatus includes: a reception unit that receives multiple captured images that are captured with a capture device in parallel from an external apparatus to which the capture device that captures an object is connected; a detection unit that detects a priority image that is included in the multiple captured images being received by the reception unit and is assigned priority information that specifies the priority image to be preferentially displayed on a display device; and a controller that controls the reception unit to stop receiving other captured images which are not detected by the detection unit and to receive the priority image detected by the detection unit and controls the display device to display the priority image on the display device when the priority image is detected by the detection unit.

13 Claims, 12 Drawing Sheets

OTHER PUBLICATIONS

Tetsuo Iyoda, et al.; "LightCollabo": Distant Collaboration Support System Involving Real Objects; Fuji Xerox Co., Ltd., Technical Report No. 16; 2006; pp. 1-11.

Japanese Office Action dated Oct. 5, 2010 for corresponding Japanese patent application No. 2008-261106 and English-language translation.

* cited by examiner

IN THIS CASE THE SECOND IMAGE WITH THE PRIORITY TAG IS PREFERENTIALLY RECEIVED

INFORMATION PROCESSING APPARATUS, REMOTE INDICATION SYSTEM, AND COMPUTER READABLE MEDIUM

CROSS-REFERENCE TO RELATED APPLICATION

This application is based on and claims priority under 35 USC 119 from Japanese Patent Application No. 2008-261106 filed Oct. 7, 2008.

BACKGROUND

1. Technical Field

This invention relates to an information processing apparatus, a remote indication system and a computer readable medium.

2. Related Art

There has been conventionally known a remote indication system including a server (e.g. a computer) with which a video camera and a projector are connected, and a client (e.g. a computer) of a remote place connected with the server via a network.

SUMMARY

According to an aspect of the present invention, there is provided an information processing apparatus including: a reception unit that receives multiple captured images that are captured with a capture device in parallel from an external apparatus to which the capture device that captures an object is connected; a detection unit that detects a priority image that is included in the multiple captured images being received by the reception unit and is assigned priority information that specifies the priority image to be preferentially displayed on a display device; and a controller that controls the reception unit to stop receiving other captured images which are not detected by the detection unit and to receive the priority image detected by the detection unit and controls the display device to display the priority image on the display device when the priority image is detected by the detection unit.

BRIEF DESCRIPTION OF THE DRAWINGS

Exemplary embodiments of the present invention will be described in detail based on the following figures, wherein.

DETAILED DESCRIPTION

A description will now be given, with reference to the accompanying drawings, of exemplary embodiments of the present invention.

Figure 1:
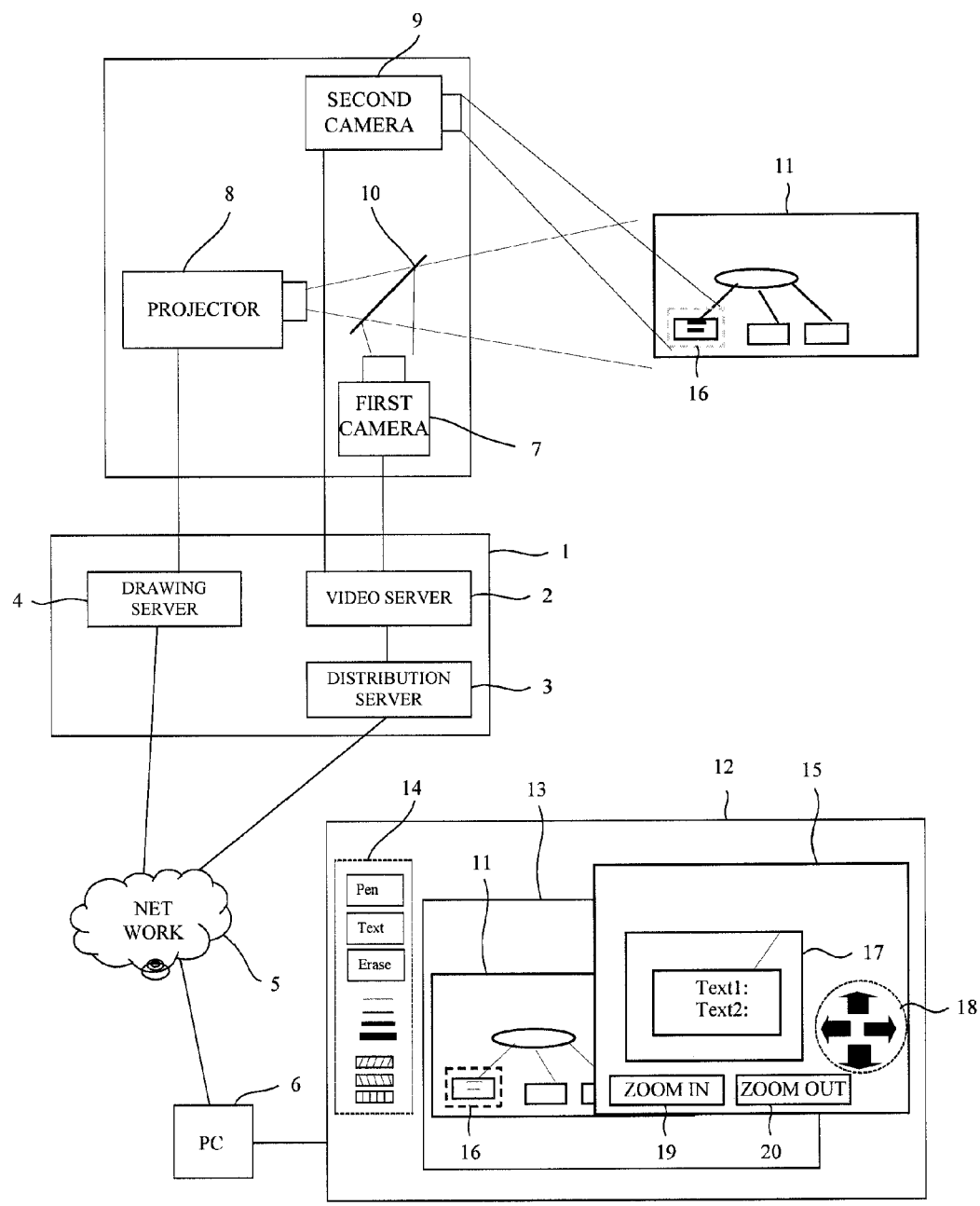
FIG. 1 is a block diagram showing the structure of a remote indication system in accordance with an exemplary embodiment of the present invention.

FIG. 1 is a block diagram showing the structure of a remote indication system in accordance with an exemplary embodiment of the present invention.

The remote indication system in FIG. 1 is provided with a server system 1 corresponding to a first information processing apparatus, and a PC 6 functioning as a second information processing apparatus. These elements are connected to each other via a network 5 functioning as means of communication. The server system 1 is provided with a video server 2, a distribution server 3 connected to a first camera 7 and a second camera 9, and a drawing server 4 that is connected to a projector 8. Based on a control command from the drawing server 4, the projector 8 emits light beams or projects an annotation image onto an object 11 (e.g. a screen) via a half mirror 10. It should be noted that the annotation image includes an image of any types such as a line, a character, a symbol, a figure, a color, and a font.

The first camera 7 is composed of a video camera, captures a reflected image of the object 11 via the half mirror 10, and outputs the captured image to the video server 2. More specifically, the first camera 7 captures the overview image of the object 11. It is better that an angle of view and an optical axis of the first camera 7 are identical with those of the projector 8, because the half mirror 10 can work with the first camera 7 and the projector 8.

The second camera 9 is composed of a network camera or a camera with a pan tilt zoom function, and is moved freely by an operator. The second camera 2 outputs the captured image to the video server 2. And the second camera 9 is used for enlarging and capturing a part of the object 11. More specifically, the second camera 9 captures a part of the object 11.

The video server 2 stores the captured images by the first camera 7 and the second camera 9. The distribution server 3 distributes the captured images by the first camera 7 and/or the second camera 9 to the PC 6 based on a distribution request of the captured image from the PC 6. The drawing server 4 acquires the annotation image from the PC 6, and outputs it to the projector 8. It should be noted that the server system 1 may be composed of one server with functions of the video server 2, the distribution server 3, and the drawing server 4 although the server system 1 is composed of several servers in this embodiment.

A display device 12 is connected with the PC 2. The display device 12 displays a first window 13 displaying the captured image by the first camera 7, a user interface (UI) 14 to draw the annotation image, and a second window 15 displaying the captured image by the second camera 9. The UI 14 includes a group of buttons such as a pen button, a text button, and an erase button, and icons defined by lines and colors. For example, when the pen button of the UI 14 is pushed down and a figure is drawn on the object 11 in the first window 13, the figure data is output to the projector 8 from the PC 6 via the drawing server 4. The projector 8 draws the figure on the object 11 based on the figure data.

In FIG. 1, the second window 15 displays a display area 17 displaying an object 16 which is a part of the object 11, an operation button 18, a zoom in button 19 and a zoom out button 20. It is unnecessary that the second window 15 is displayed all the time. The second window 15 is displayed on the display device 12 when a predetermined command is input to the PC 6. When the operation button 18 is pushed down, the second camera 9 changes its direction based on the direction that the button pushed down indicates. At this time, the image displayed in the display area 17 is changed depending on the movement of the second camera 9. When the zoom in button 19 or the zoom out button 20 is pushed down, the image displayed in the display area 17 is enlarged or reduced.

And the PC 6 outputs a control command to the projector 8 via the drawing server 4, and controls a brightness of the projected image by the projector 8. Also the PC 6 outputs the control command to the first camera 7 and the second camera 9 via the video server 2 and the distribution server 3, and controls the capturing angle and the brightness of the captured image by the first camera 7 and the second camera 9.

It should be noted that the remote indication system can be provided with several clients (PCs) although only the PC 6 is illustrated as a client in FIG. 1.

Figure 2:
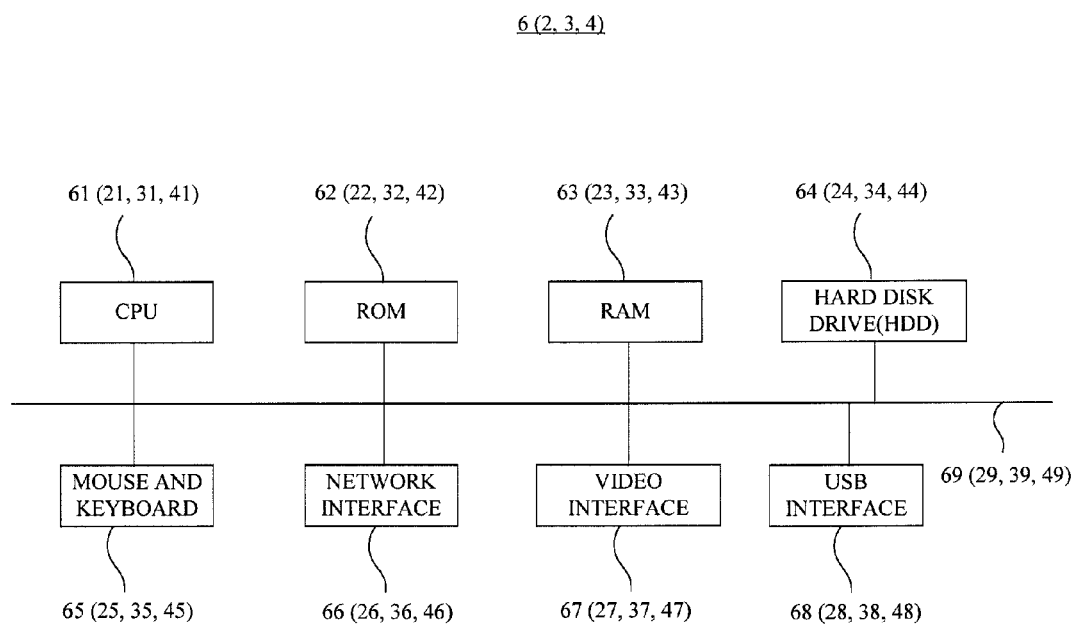
FIG. 2 is a block diagram showing the hardware structure of PC 6.

FIG. 2 is a block diagram showing the hardware structure of the PC 6.

Since the hardware structure of the PC 6 is the same as the each hardware structure of the video server 2, the distribution server 3, and the drawing server 4, a description will now be given of the hardware structure of the PC 6 herein after. It should be noted that, in FIG. 2, the reference numerals 21 to 29 designate the elements of the video server 2 and the reference numerals 31 to 39 designate the elements of the distribution server. And the reference numerals 41 to 49 designate the elements of the drawing server 4 and the reference numerals 61 to 69 designate the elements of the PC 6.

The PC 6 includes: a CPU 61 (a reception unit, a detection unit, a controller, a second reception unit) that controls the entire PC 6; a ROM 62 that stores control programs; a RAM 63 that functions a working area; a hard disk drive (HDD) 64 that stores various information and programs; a mouse and keyboard 65; a network interface 66 that is connected to other computers; a video interface 67 that is connected to the display device; and a USB (Universal Serial Bus) interface 68 that is connected to a USB device, not shown. The CPU 61 is connected to the ROM 62, the RAM 63, the HDD 64, the mouse and keyboard 65, the network interface 66, the video interface 67 and the USB interface 68 via a system bus 69. It should be noted that a CPU of a server combining the video server 2, the distribution server 3 and the drawing server 4 corresponds to a first reception unit and an addition unit.

Figure 3:
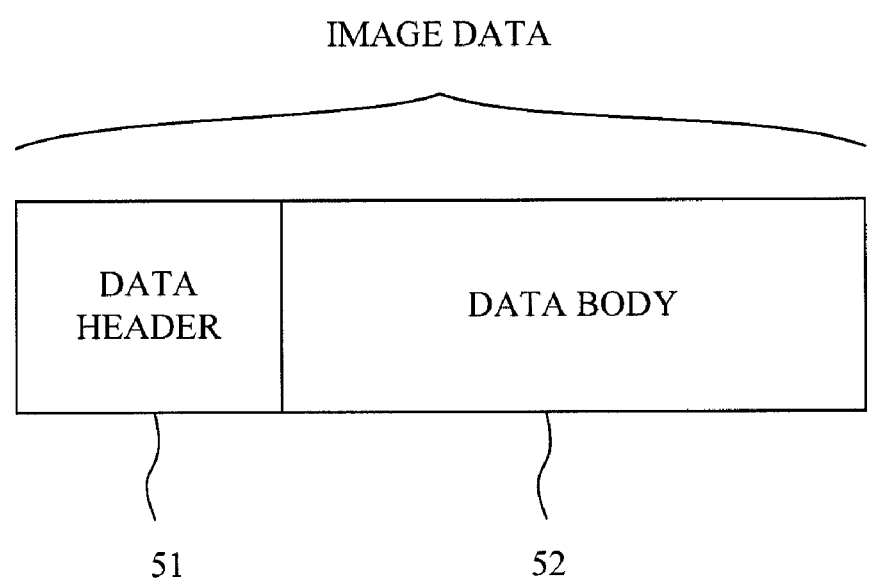
FIG. 3 illustrates the data structure of image data received by PC 6.

FIG. 3 illustrates the data structure of the image data received by the PC 6.

As illustrated in FIG. 3, the image data received by the PC 6 are composed of a data header 51 with header information, and a data body 52. The data header 51 contains attribute information such as a capture time, a type of the image data and a size as needed, and may contains a priority tag (priority information) as described hereinafter. The data body 52 is real data of the image.

Figure 4A:
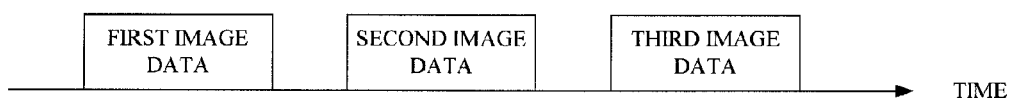
FIG. 4A illustrates an existing reception condition of image data.
Figure 4B:
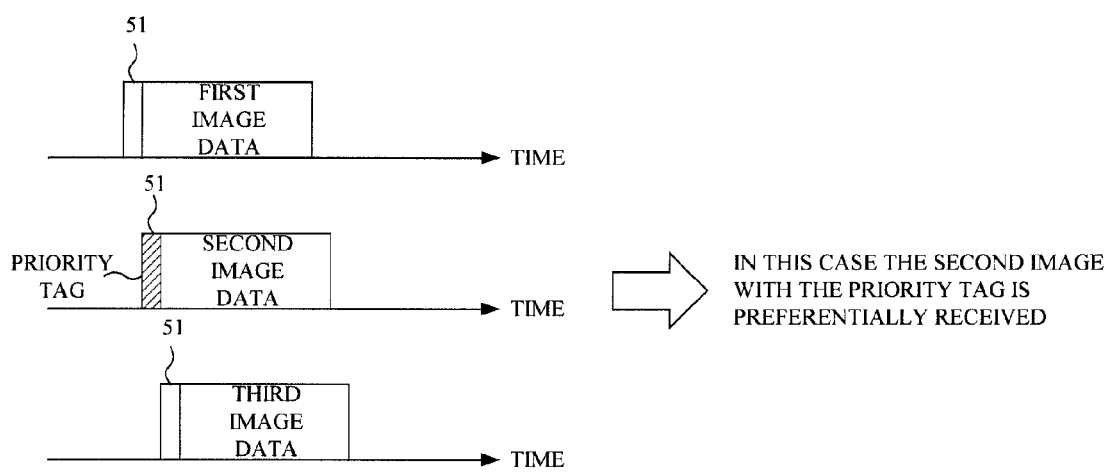
FIG. 4B illustrates a reception condition of image data of this embodiments.

FIG. 4A illustrates the reception condition that a known apparatus receives the image data, and FIG. 4B illustrates the reception condition that the remote indication system in accordance to this embodiment receives the image data.

As illustrated in FIG. 4A, when the image data are distributed in order of a first image, a second image and a third image from the distribution server 3, the PC 6 receives the image data based on that order. In accordance with this embodiment as illustrated in FIG. 4B, the PC 6 requests to receive the data header of new image data whether or not the PC 6 is receiving the image data. And when the data header contains the priority tag, the PC 6 cancels receiving the image data the PC 6 is receiving, receives the image data of the image (priority image) that has the data header containing the priority tag (priority information), and displays the priority image on the display device 12. When there is not the image data the PC 6 is receiving, the PC 6 receives the image data of the priority image, and displays it on the display device 12. In the example illustrated in FIG. 4B, the PC 6 receives the second image with the priority tag, and displays the second image on the display device 12.

Figure 5:
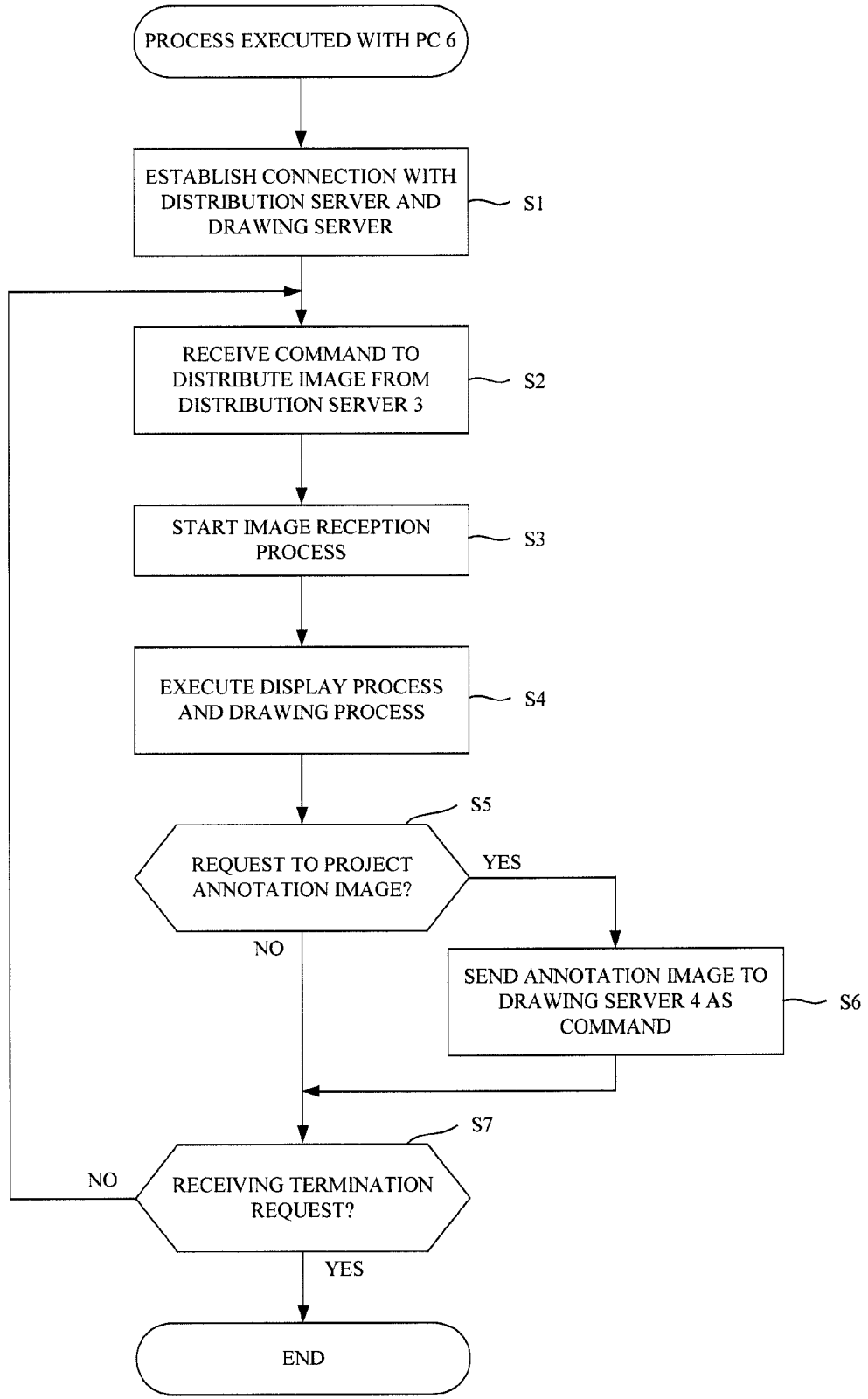
FIG. 5 is a flowchart showing a process executed with PC 6.

FIG. 5 is a flowchart showing a process executed with the PC 6.

First, the CPU 61 of the PC 6 establishes a connection with the distribution server 3 and the drawing server 4 (step S1).

Then, the CPU 61 receives a command to distribute the image from the distribution server 3 (step S2), and starts an image reception process (step S3). A detail of the image reception process is described hereinafter.

The CPU 61 executes a display process to display the received image data in the first window 13 or the second window 15, and a drawing process to reflect the annotation image drawn with the UI 14 to the first window 13 (step S4).

The CPU 61 determines whether there is a projection request that requests to project the annotation image drawn in the first window 13 (step S5). When the determination of the step S5 is YES, the CPU 61 sends the annotation image drawn in the first window 13 to the drawing server 4 as a command (step S6), and moves to the step S7 described below.

When the determination of the step S5 is NO, the CPU 61 determines whether there is a termination request (e.g. a request to shut down a power) (step S7). When the determination of the step S7 is YES, the present process is terminated. Meanwhile, when the determination of the step S7 is NO, the CPU 61 goes back to the step S2.

Figure 6:
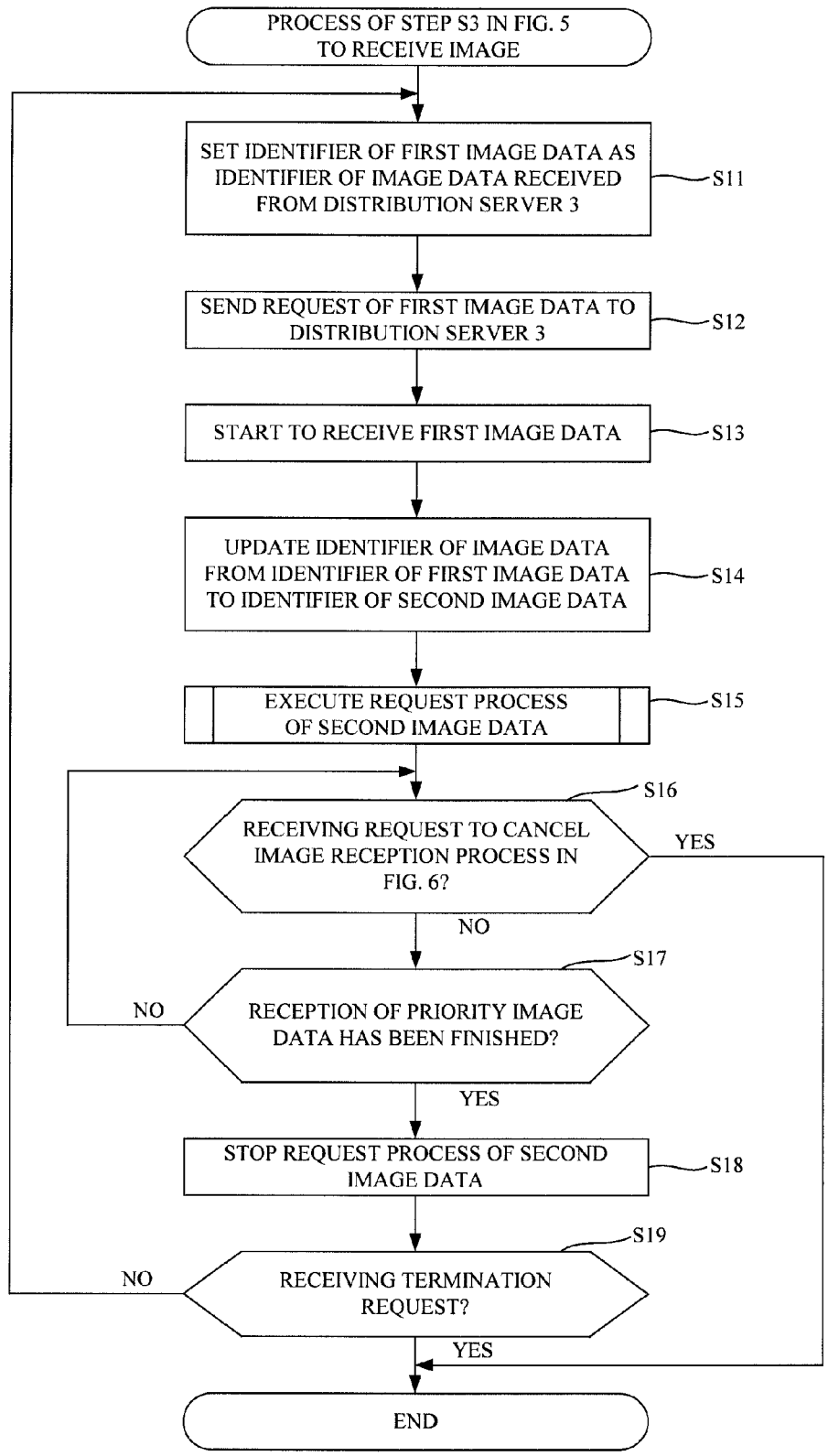
FIG. 6 is a flowchart showing an image reception process of the step S3 in FIG. 5.

FIG. 6 is a flowchart showing the image reception process of the step S3 in FIG. 5.

Here, the image data to be displayed in the first window 13 are described as the first image data, the second image data, and the third image data in order of the distribution. And 001, 002, 003 are added to each of the first image data, the second image data and the third image data as an identifier.

First, the CPU 61 sets the identifier of the first image data (it means 001) as the identifier of the image data received from the distribution server 3 (step S11), and sends the request of the first image data to the distribution server 3 (step S12). Then the CPU 61 starts to receive the response that means the first image data from the distribution server 3 (step S13).

The CPU 61 updates the identifier of the image data received from the distribution server 3 from the identifier of the first image data to the identifier of the second image data (step S14), and executes the request process of the second image data (step S15).

Figure 7:
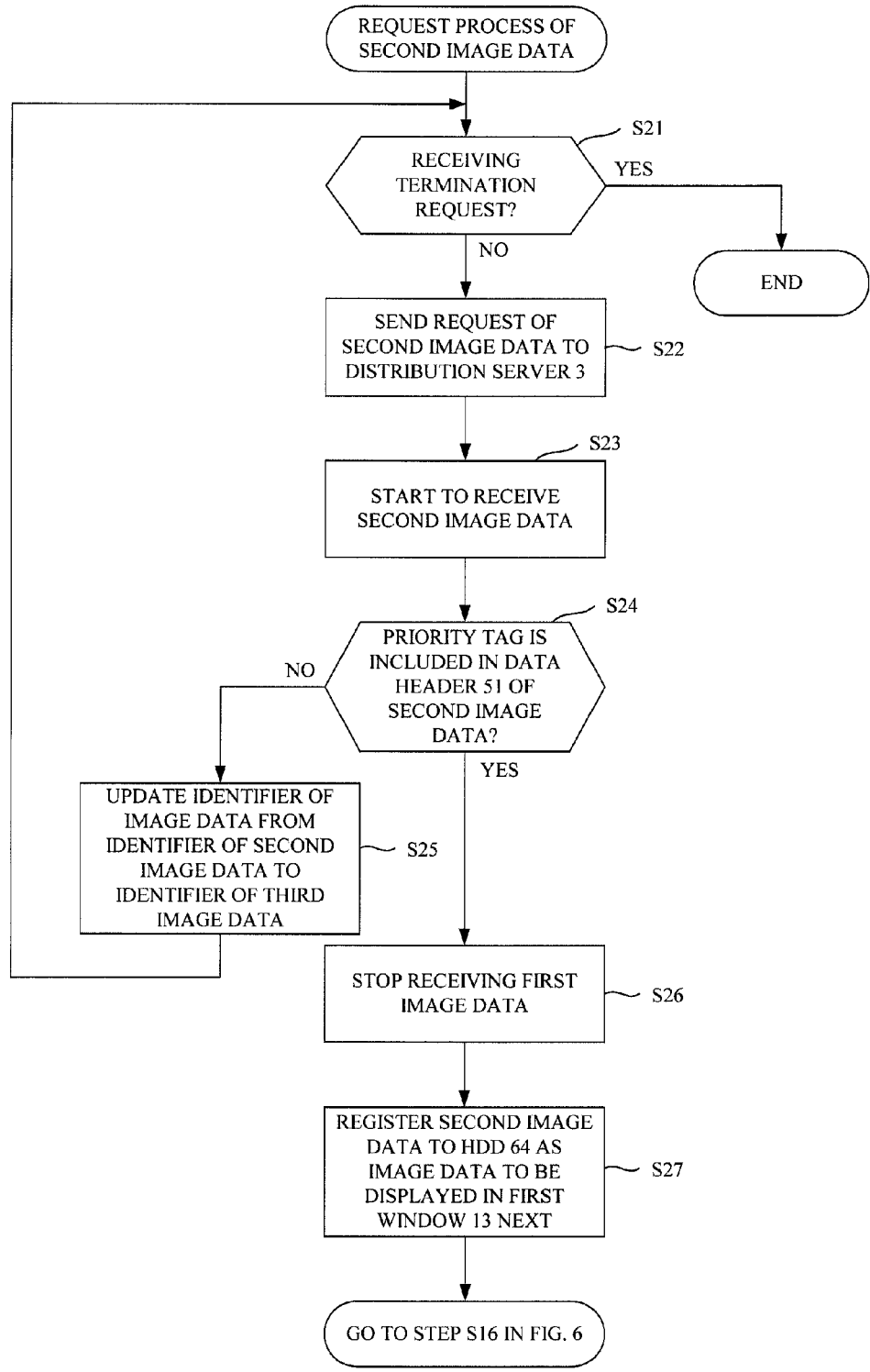
FIG. 7 is a flowchart showing a request process of a second image data.

FIG. 7 is a flowchart showing the request process of the second image data.

First, the CPU 61 determines whether it is receiving the termination request (e.g. a request to shut down a power) (step S21). When the determination of the step S21 is YES, the present process is terminated. Meanwhile, when the determination of the step S21 is NO, the CPU 61 sends the request of the second image data to the distribution server 3 (step S22). It should be noted that the second image data is captured after the first image data, and is newer than the first image data.

The CPU 61 starts to receive the response that means the second image data from the distribution server 3 (step S23). Then, the CPU 61 determines whether the priority tag is included in the data header 51 of the second image data (step S24). The priority tag is the tag to specify the image data to be displayed next after the image data being displayed in the first window 13.

When the determination of the step S24 is NO, the CPU 61 updates the identifier of the image data received from the distribution server 3 from the identifier of the second image data to the identifier of the third image data (step S25), and goes back to the step S21. In the loop processing from the step S21 to the step S23, the CPU 61 receives the data header 51 of the new image data after the data header 51 of the new image data, and determines whether its data header 51 includes the priority tag.

When the determination of the step S24 is YES, the CPU 61 stops receiving the first image data, the process of the step S13 in FIG. 6 (step S26). And the CPU 61 registers the second image data to the HDD 64 as the image data to be displayed in the first window 13 next (step S27), and moves to the step S16 in FIG. 6.

The CPU 61 determines whether it is receiving the request which requests to cancel the image reception process in FIG. 6 from the mouse and keyboard 65 (step S16).

When the determination of the step S16 is YES, the present process is terminated. Meanwhile, when the determination of the step S16 is NO, the CPU 61 determines whether the reception of the image data with the priority tag has been finished (step S17). When the determination of the step S17 is NO, the CPU 61 goes back to the step S16. Meanwhile, when the determination of the step S17 is YES, the CPU 61 stops the request process of the second image data (step S18).

Lastly, the CPU 61 determines whether it is receiving the termination request (e.g. a request to shut down a power) (step S19). When the determination of the step S19 is YES, the present process is terminated. Meanwhile, when the determination of the step S19 is NO, the CPU 61 goes back to the step S11.

Figure 8:
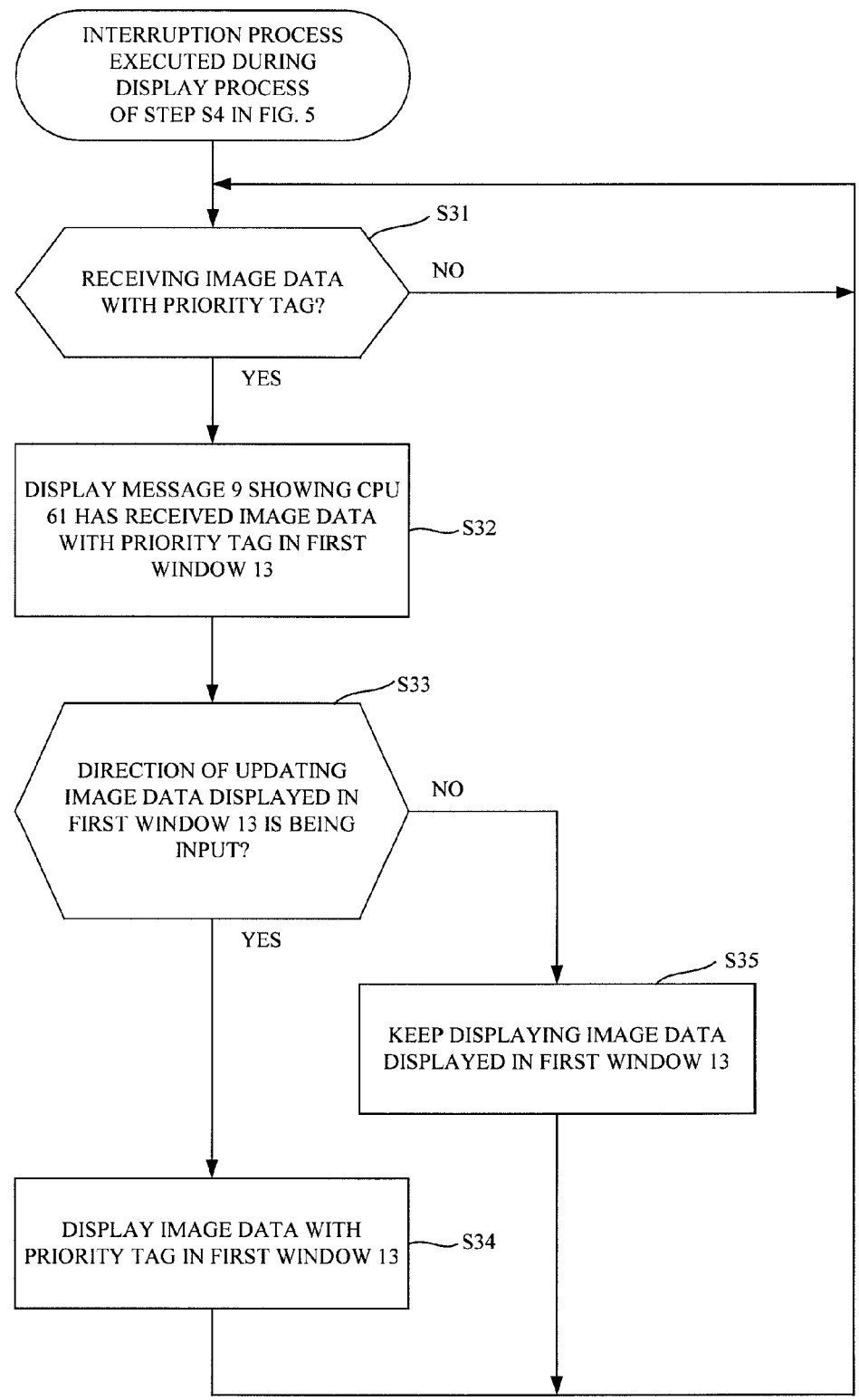
FIG. 8 is a flowchart showing an interruption process executed during a display process of the step 4 in FIG. 5.

FIG. 8 is a flowchart showing the interruption process executed during the display process of the step S4 in FIG. 5.

Figure 9:
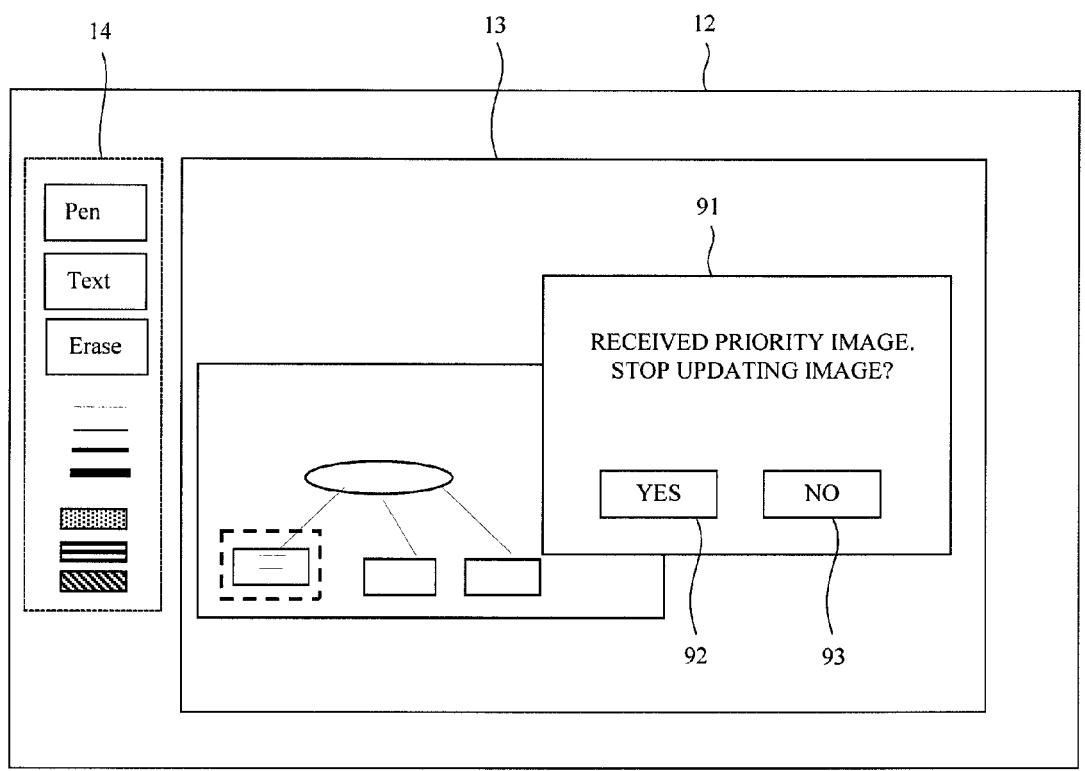
FIG. 9 illustrates an example of a message 91 displayed in first window 13.

First, the CPU 61 of the PC 6 determines whether it has received the image data with the priority tag (step S31). When the determination of the step S31 is NO, the CPU 61 repeats this determination. Meanwhile, when the determination of the step S31 is YES, the CPU 61 displays the message 91 showing that the CPU 61 has received the image data with the priority tag in the first window 13 (step S32). As illustrated in FIG. 9, this message 91 has a button 92 to stop updating the image data displayed in the first window 13, and a button 93 to direct the CPU 61 to update the image data displayed in the first window 13.

Then, the CPU 61 determines whether the direction of updating the image data displayed in the first window 13 is being input (step S33). When the determination of the step S33 is YES, the CPU 61 displays the image data with the priority tag in the first window 13 (step S34), and goes back to the step S31. Meanwhile, when the determination of the step S33 is NO, the CPU 61 keeps displaying the image data displayed in the first window 13 (step S35), and goes back to the step S31.

Figure 10:
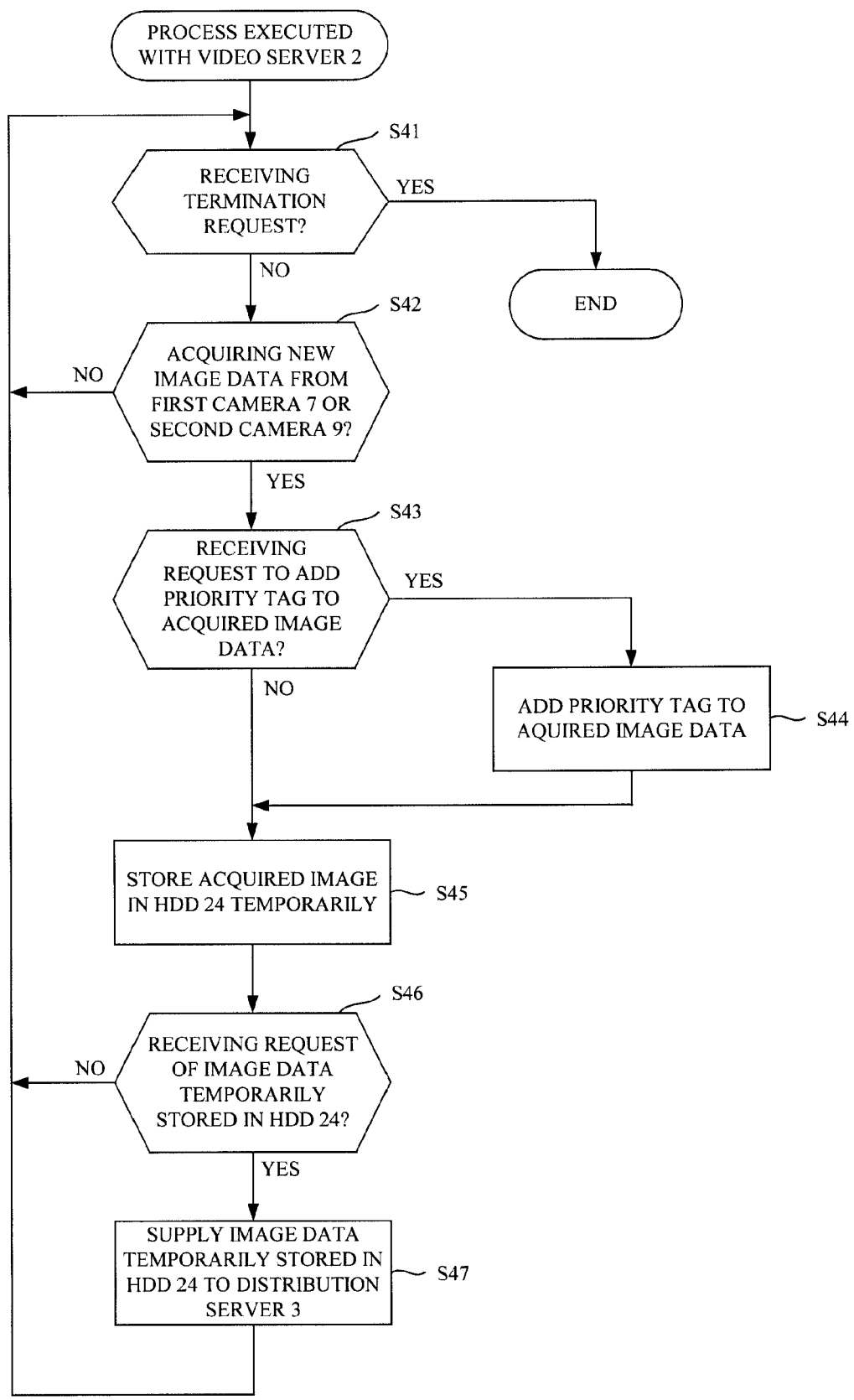
FIG. 10 is a flowchart showing a process executed with a video server 2.

FIG. 10 is a flowchart showing a process executed with the video server 2.

First, the CPU 21 of the video server 2 determines whether it is receiving the termination request (e.g. a request to shut down a power) (step S41). When the determination of the step S41 is YES, the present process is terminated. Meanwhile, when the determination of the step S41 is NO, the CPU 21 determines whether it is acquiring the new image data from the first camera 1 or the second camera 9 (step S42).

When the determination of the step S42 is NO, the CPU 21 goes back to the step S41. Meanwhile, when the determination of the step S42 is YES, the CPU 21 determines whether it is receiving the request which requests to add the priority tag to the acquired image data (step S43). The request which requests to add the priority tag to the image data is specified with the mouse and keyboard 25 that are connected to the video server 2. Or it is specified by the access to the video server 2 from the PC 6. Also it should be noted that the request which requests to add the priority tag to the image data may be specified automatically at predetermined intervals (e.g. ten seconds) based on the order of the program stored in HDD 24.

When the determination of the step S43 is YES, the CPU 21 adds the priority tag to the acquired image data (step S44), and temporarily stores the image data with the priority tag in the HDD 24 (step S45). Meanwhile, when the determination of the step S43 is NO, the CPU 21 moves to the step S45. In this case, the image data temporarily stored in HDD 24 is not being added the priority tag to.

Then, the CPU 21 determines whether it is receiving the request of the image data temporarily stored in the HDD 24 from the distribution server 3 (step S46). When the determination of the step S46 is YES, the CPU 21 supplies the data image temporarily stored in the HDD 24 to the distribution server 3 (step S47), and goes back to the step S41. Meanwhile when the determination of the step S46 is NO, the CPU 21 goes back to the step S41.

Figure 11:
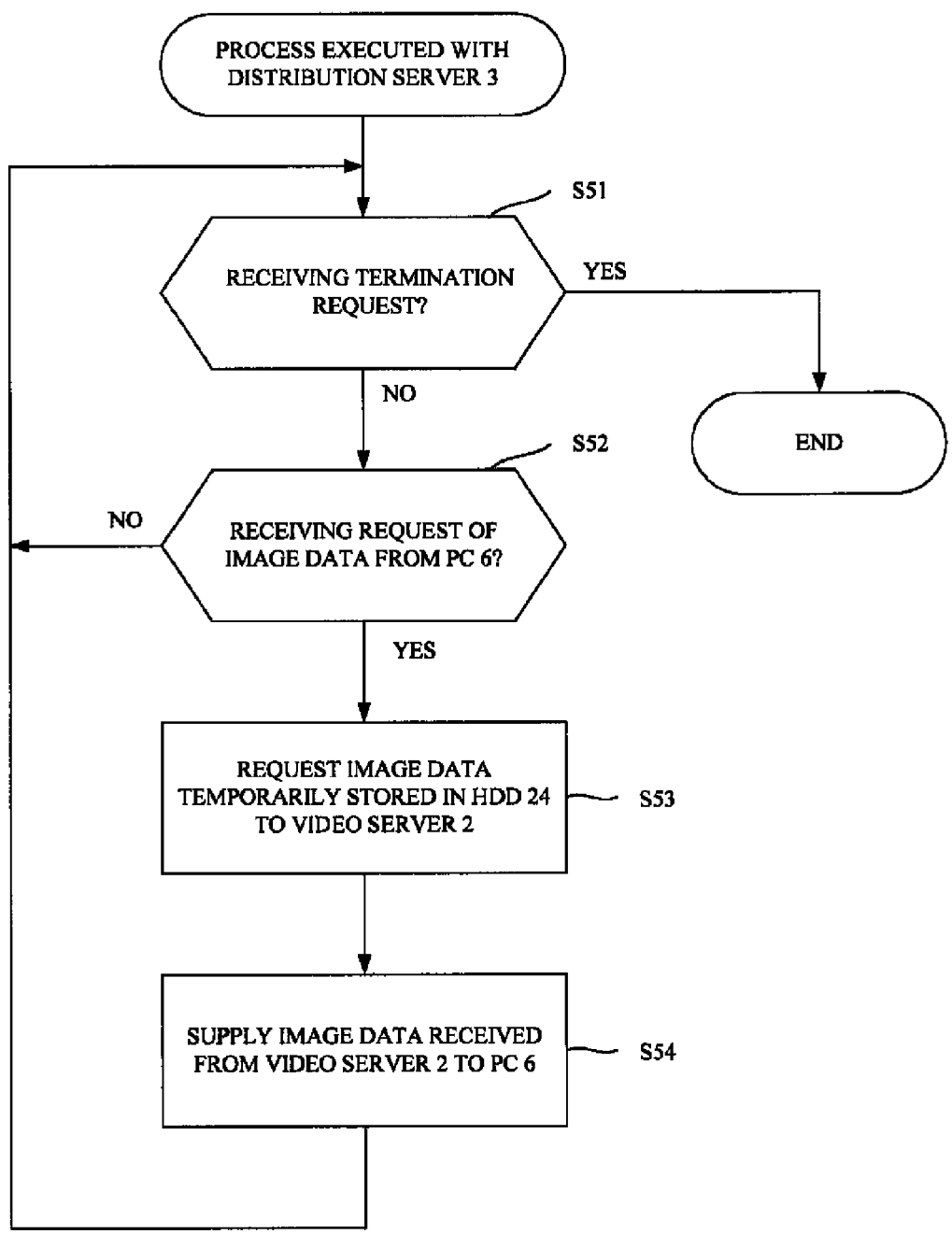
FIG. 11 is a flowchart showing a process executed with a distribution server 3.

FIG. 11 is a flowchart showing the process executed with the distribution server 3.

First, the CPU 31 of the distribution server 3 determines whether it is receiving the termination request (e.g. a request to shut down a power) (step S51). When the determination of the step S51 is YES, the present process is terminated. Meanwhile when the determination of the step S51 is NO, the CPU 31 determines whether it is receiving the request of the image data from the PC 6 (step S52).

When the determination of the step S52 NO, the CPU 31 goes back to the step S51. Meanwhile, when the determination of the step S52 is YES, the CPU 31 requests the image data temporarily stored in the HDD 24 to the video server 2 (step S53), supplies the image data received from the video server 2 to the PC 6 (step S54), and goes back to the step S51.

Figure 12:
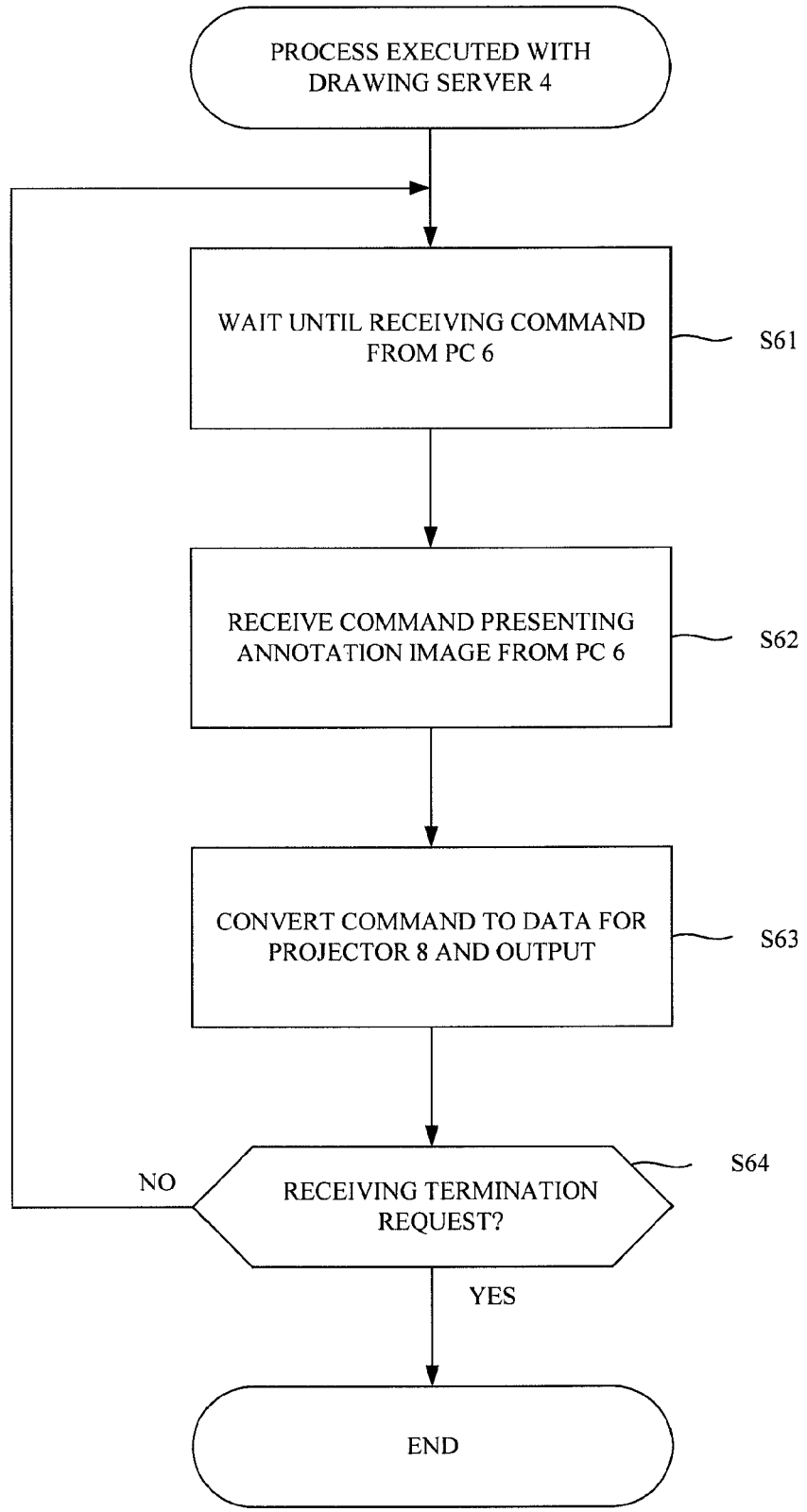
FIG. 12 is a flowchart showing a process executed with a drawing server 4.

FIG. 12 is a flowchart showing the process executed with the drawing server 4.

The CPU 41 of the drawing server 4 waits until it receives a command from the PC 6 (step S61). When the CPU 41 receives the command presenting the annotation image from the PC 6 (step S62), the CPU 41 converts the command to the data for the projector 8, and outputs it (step S63). The projector 8 projects the annotation image onto the object 11 based on the converted data.

Then, the CPU 41 determines whether it is receiving the termination request (e.g. a request to shut down a power) (step S64). When the determination of the step S64 is YES, the present process is terminated. Meanwhile, when the determination of the step S64 is NO, the CPU 41 goes back to the step S61.

As described in detail above, according to the exemplary embodiment, the CPU 61 starts to receive the several image data in parallel from the server system 1 to which the first camera 7 and the second camera 9 that capture the object are connected, detects the image data with the priority tag to be preferentially displayed on the display device 12 from the several image data being received, stops receiving the image data from which the priority tag hasn't been detected, and displays the image data from which the priority tag has been detected on the display device 12. Therefore, the specified image data is preferentially displayed regardless of the reception condition of the image data. Also a communication band of the network is used efficiently because the reception of the image data from which the priority tag is not detected is stopped.

It should be noted that the CPU 61 may display the buttons 92 and 93 to choose whether a user stops updating the image data displayed on the display device 12 when the image data with the priority tag has been received. In addition it should be noted that before that the CPU 61 may display information showing that the CPU 61 has received the image data with the priority tag. In these cases, the user can figure out the display of the priority image, and choose whether or not to stop updating the captured image displayed on the display device 12.

A recording medium on which the software program for realizing the functions of the PC 6 is recorded may be supplied to the PC 6, and the CPU 61 of the PC 6 may read and execute the program recorded on the recording medium. In this manner, the same effects as those of the above-described exemplary embodiment can be achieved. The recording medium for providing the program may be a CD-ROM, a DVD, or a SD card, for example.

Alternatively, the CPU 61 of the PC 6 may execute a software program for realizing the functions of each PC, so as to achieve the same effects as those of the above-described exemplary embodiment.

It should be noted that the present invention is not limited to those exemplary embodiments, and various modifications may be made to them without departing from the scope of the invention.

What is claimed is:

1. An information processing apparatus comprising:
   a reception unit that receives multiple captured images that are captured with a capture device in parallel from an external apparatus to which the capture device that captures an object is connected;
   a detection unit that detects a priority image from among the multiple captured images being received by the reception unit, the priority image having priority information that specifies the priority image to be preferentially displayed on a display device;
   a controller that controls the reception unit to stop receiving other captured images which are not detected by the detection unit and to receive first image data that corresponds to the priority image detected by the detection unit and controls the display device to display the first image data corresponding to the priority image on the display device when the priority image is detected by the detection unit; and
   a requesting unit that requests a second image data based on priority information while receiving the first image data.

2. The information processing apparatus according to claim 1, wherein the detection unit detects the priority image with the priority information from header information of each of the multiple captured images received by the reception unit.

3. The information processing apparatus according to claim 1, wherein the controller controls the display device to display selection information to choose whether or not a user stops updating an image displayed on the display device to the priority image when the reception unit receives the priority image.

4. The information processing apparatus according to claim 1, further comprising a setting unit that sets an identifier of at least one of the captured images,
   wherein the requesting unit requests the second image based on the identifier.

5. The information processing apparatus according to claim 1, wherein the controller controls the reception unit to receive the second image data if the priority information of the second image data identified the second image data as a priority image and to stop receiving the first image data.

6. A remote indication system comprising:
   a first information processing apparatus including
   a first reception unit that receives multiple captured image from a capture device that captures an object, and
   an addition unit that adds priority information that specifies a priority image displayed preferentially on a display device to one or more of the multiple captured image received by the first reception unit; and
   a second information processing apparatus including
   a second reception unit that is connected to the first information processing apparatus via a communication medium, and receives the multiple captured image in parallel from the first information processing apparatus,
   a detection unit that detects the priority image from the multiple captured images received by the second reception unit in accordance with the priority information,
   a controller that controls the second reception unit to stop receiving other captured images which are not detected by the detection unit and to receive first image data that corresponds to the priority image detected by the detection unit and controls the display device to display the first image data that corresponds to the priority image on the display device when the priority image is detected by the detection unit; and
   a requesting unit that requests second image data based on priority information while receiving the first image data.

7. The remote indication system according to claim 6, wherein the addition unit adds the priority information to a captured image selected by the first information processing apparatus or the second information processing apparatus.

8. The information processing apparatus according to claim 6, wherein the detection unit detects the priority image with the priority information from header information of each of the multiple captured images received by the second reception unit.

9. The information processing apparatus according to claim 6, wherein the controller controls the display device to display selection information to choose whether or not a user stops updating an image displayed on the display device to the priority image when the second reception unit receives the priority image.

10. The information processing apparatus according to claim 6, further comprising a setting unit that sets an identifier of at least one of the captured images,
    wherein the requesting unit requests the second image based on the identifier.

11. The information processing apparatus according to claim 6, wherein the controller controls the second reception unit to receive the second image data if the priority information of the second image data identified the second image data as a priority image and to stop receiving the first image data.

12. A recording medium causing a computer to execute a process, the process comprising:
    receiving multiple captured images by a capture device in parallel from an external apparatus to which the capture device that captures an object is connected;

detecting a priority image from among the multiple captured images being received, the priority image having priority information that specifies the priority image to be preferentially displayed on a display device;

stopping receiving other captured images not assigned the priority information, and receiving first image data that corresponds to the priority image with the priority information to display the first image data that corresponds to the priority image on the display device when the priority image is detected; and requesting second image data based on priority information while receiving the first image data.

13. An information processing apparatus comprising:

a setting unit that sets an identifier of a captured image which is captured by a capture device as an identifier of a receiving image and updates the identifier;

a requesting unit that requests an external apparatus to which the capture device that captures an object is connected to send a captured image in accordance with the identifier;

a receiving unit that receives the captured image which is requested to be sent; and a detection unit that detects a priority tag which is included in header information of the captured image received by the receiving unit, wherein the receiving unit receives a second image if the second image has a priority tag and stops receiving a first captured image which is currently being received if the first captured image does not have a priority tag, the received second captured image is displayed on a display device, and the setting unit updates the identifier of the receiving image when the detection unit does not detect a priority tag in a captured image.

* * * * *